US007492495B2

United States Patent
Ishihara et al.

(10) Patent No.: US 7,492,495 B2
(45) Date of Patent: Feb. 17, 2009

(54) OPTICAL SCANNING APPARATUS AND SCANNING IMAGE DISPLAY APPARATUS

(75) Inventors: Keiichiro Ishihara, Yokohama (JP); Shigehiro Kadota, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/625,354

(22) Filed: Jan. 22, 2007

(65) Prior Publication Data

US 2007/0171497 A1 Jul. 26, 2007

(30) Foreign Application Priority Data

Jan. 25, 2006 (JP) ............................. 2006-016218

(51) Int. Cl.
*G02B 26/08* (2006.01)
(52) U.S. Cl. ..................... 359/202; 359/198; 359/199; 359/214
(58) Field of Classification Search ................. 359/202
See application file for complete search history.

(56) References Cited

U.S. PATENT DOCUMENTS 4,180,307 A * 12/1979 Tateoka et al. ............. 359/202
4,329,012 A * 5/1982 Minoura et al. ............ 359/202
7,262,894 B2 * 8/2007 Oettinger et al. ........... 359/201
2005/0190419 A1 * 9/2005 Ishihara ..................... 359/202

FOREIGN PATENT DOCUMENTS

| JP | 08-009306   | 1/1996 |
| JP | 08-079669   | 3/1996 |
| JP | 2000-180779 | 6/2000 |

* cited by examiner

*Primary Examiner*—James Phan
(74) *Attorney, Agent, or Firm*—Cowan, Liebowitz & Latman, P.C.

(57) ABSTRACT

An optical scanning apparatus in which keystone distortion non-linearity distortion in a projected image can be excellently corrected is provided. An optical scanning apparatus has light source means and deflecting means for deflecting a light beam emitted from the light source means two-dimensionally in a first direction and a second directrion, the deflection speed of the deflecting means being higher in the first direction than in the second direction. The deflecting means is driven in such a way that its angular velocity in the second direction is smaller when optically scanning a position on the surface to be scanned at which the angle of incidence of the deflected light beam in the second direction is larger than when optically scanning a position on said surface to be scanned at which the angle of incidence of the deflected light beam in said second direction is small.

5 Claims, 9 Drawing Sheets

OPTICAL SCANNING APPARATUS AND SCANNING IMAGE DISPLAY APPARATUS

BACKGROUND OF THE INVENTION

1. Field of the Invention

The present invention relates to an optical scanning apparatus and a scanning image display apparatus having the same. In particular, the present invention is suitably used to cases where a surface to be scanned is two-dimensionally scanned with a light beam by deflecting means so that a two-dimensional image is to be viewed on the surface to be scanned.

2. Description of the Related Art

There has been known a two-dimensional optical scanning apparatus that performs optical scanning by deflecting a light beam emitted from light source means two-dimensionally using deflecting means and focusing the beam as a spot on a surface to be scanned using an optical system.

There has been proposed a scanning image display apparatus in which a two-dimensional image is to be viewed as residual image of a scanning locus on a surface to be scanned in two dimensional scanning with a deflected light beam (see U.S. Pat. No. 5,485,225).

The deflecting means used for deflecting a light beam from light source means includes a polygon mirror, a Galvano mirror, and a MEMS device manufactured using MEMS (Micro Electro-Mechanical Systems) technology.

The deflecting means performs fast scan in a first direction by changing the deflection direction fast and slow scan in a direction perpendicular to the first direction by changing the deflection direction slowly. In the two-dimensional optical scanning apparatus, each scanning line is formed through fast scan by the deflecting means, and scanning lines are arranged sequentially side by side by slow scan, whereby a two dimensional scan image is formed on a surface to be scanned.

The scanning line refers to a light scanning locus in scanning the surface to be scanned with light in the first direction (i.e. the direction in which the scanning speed is faster).

In the case where an image is projected onto a screen from an oblique direction, a keystone distortion occurs in the image displayed on the screen, as is well known.

The following methods have been proposed as methods for correcting keystone distortion in projected images.

In one proposed method, some pixels in a horizontal line of an image signal are removed or thinned out to make an image displayed on a liquid crystal panel (i.e. a projection screen on which an image is projected) inverted-trapezoidal to cancel a keystone distortion that is generated when the image is projected, thereby displaying a rectangular image on the projection screen (see Japanese Patent Application Laid-Open No. H08-009306).

In another known method, light emission control means for preventing a light source from emitting light corresponding to predetermined pixels so that the number of pixels displayed in a unit area in a rectangular image display area becomes uniform, whereby keystone distortion of the projected image is corrected and a rectangular image is displayed (see Japanese Patent Application Laid-Open No. 2000-180779).

It is also known that non-linearity distortion also occurs in projected images. In still another known method, an image signal is thinned out in such a way as to cancel a distortion in the vertical direction to correct non-linearity distortion (see Japanese Patent Application Laid-Open No. H08-079669).

In the image projection apparatus disclosed in U.S. Pat. No. 5,485,225, a laser beam is two-dimensionally deflected by two deflectors in the forms of a multi face mirror and a swivel mirror so that a two dimensional scan image is formed on a screen. However, this document does not refer to keystone distortion or non-linearity distortion of the two-dimensional scan image.

In the projection image display apparatus using a liquid crystal panel disclosed in Japanese Patent Application Laid-open No. H08-009306, the number of pixels in the image projected on the screen decreases toward the upper side, and therefore the resolution of the projected image is not uniform.

In the two-dimensional scanning projector disclosed in Japanese Patent Application Laid-open No. 2000-180779, keystone distortion in the projected image is corrected by allowing emission of light from the light source only in the portion corresponding to the rectangular image display area defined to conform with the shortest scanning line. Accordingly, the number of pixels in one scanning line in the image projected on the screen decreases toward the upper side, and therefore the resolution of the projected image is not uniform.

In the liquid crystal display disclosed in Japanese Patent Application Laid-Open No. H08-079669, keystone distortion is corrected by thinning-out or superimposition of image signal performed according to the position in the vertical direction. Accordingly, the number of pixels along the vertical direction in the image projected on the screen decreases toward the upper side, and therefore the resolution of the projected image is not uniform.

SUMMARY OF THE INVENTION

According to the present invention, an optical scanning apparatus has light source means and deflecting means for two-dimensionally deflecting a light beam emitted from the light source means in a first direction and a second direction, the deflection speed of the deflecting means being higher in the first direction than in the second direction. The deflecting means is driven in such a way that its angular velocity in the second direction is smaller when optically scanning a position on the surface to be scanned at which the angle of incidence of the deflected light beam in the second direction is large than when optically scanning a position on said surface to be scanned at which the angle of incidence of the deflected light beam in said second direction is small.

Further features of the present invention will become apparent from the following description of exemplary embodiments (with reference to the attached drawings).

DESCRIPTION OF THE EMBODIMENTS

Figure 1:
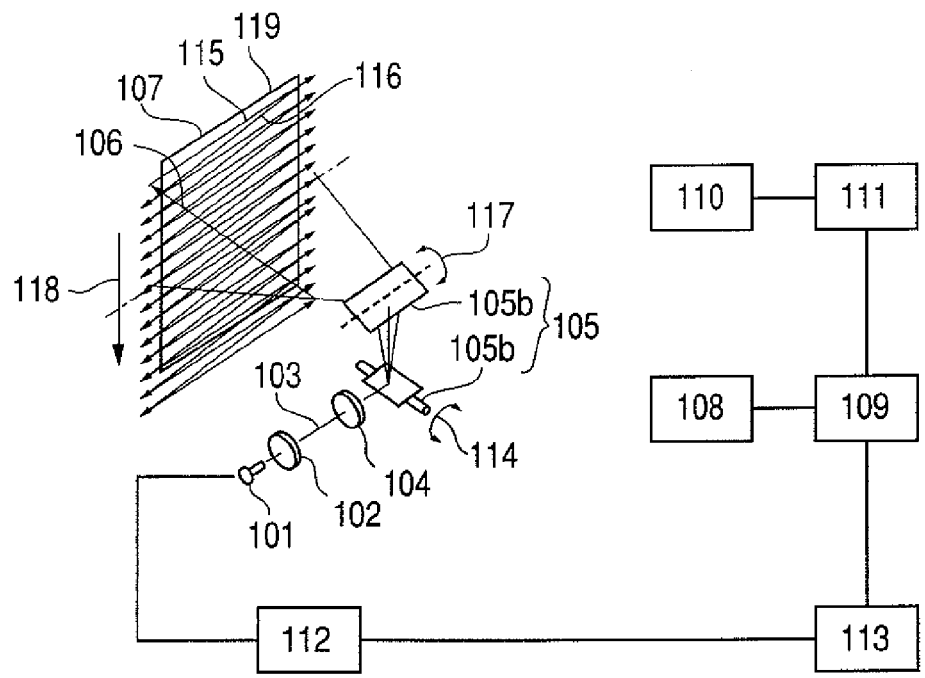
FIG. 1 is a diagram schematically showing a scanning image display apparatus according to a first embodiment of the present invention.

FIG. 1 is a diagram showing the relevant portion of a scanning image display apparatus using an optical scanning apparatus according to a first embodiment of the present invention.

In this embodiment, a light beam modulated based on image information is deflected by deflecting means in a first direction and a second direction. A surface to be scanned is two-dimensionally scanned with a deflected light beam deflected by the deflecting means where scanning loci (or scanning lines) in scanning in the first direction are arranged side by side along the second direction. In this process, a trace of movement of deflected light beam on the surface to be scanned can be seen as a scanning line thanks to a residual image in the eyes of a viewer. Since the two-dimensional scanning is performed within a time during which a residual image stays, it is viewed as a single image. The deflection speed of the deflecting means is designed to be faster in the first direction (i.e. horizontal direction) than in the second direction (i.e. vertical direction).

A light source means 101 such as a semiconductor laser is modulated based on image information. A laser beam 103 emitted from the light source means 101 is converted into a parallel beam by a collimator lens 102. The laser beam 103 emergent from the collimator lens 102 is incident on deflecting means 105 through an imaging lens 104.

The deflecting means 105 is composed of a horizontal deflector (or horizontal scanning means) 105a and a vertical deflector (or vertical scanning means) 105b and adapted to two-dimensionally deflect the light beam incident thereon.

The deflected light beam 106 reflected and deflected by the deflecting means 105 is imaged or focused as a spot on the surface to be scanned (or screen) 107 due to the condensing effect of the imaging lens 104.

A scanning line is drawn in the horizontal direction (first direction) on the surface to be scanned 107 by the light spot, and the scanning line is displaced sequentially in the vertical direction (second direction), whereby two-dimensional scanning is realized.

Here, the deflection speed of the deflecting means 105 refers to the moving speed of the light spot on the surface to be scanned 107 or the rotation speed of a MEMS mirror 201.

Figure 2:
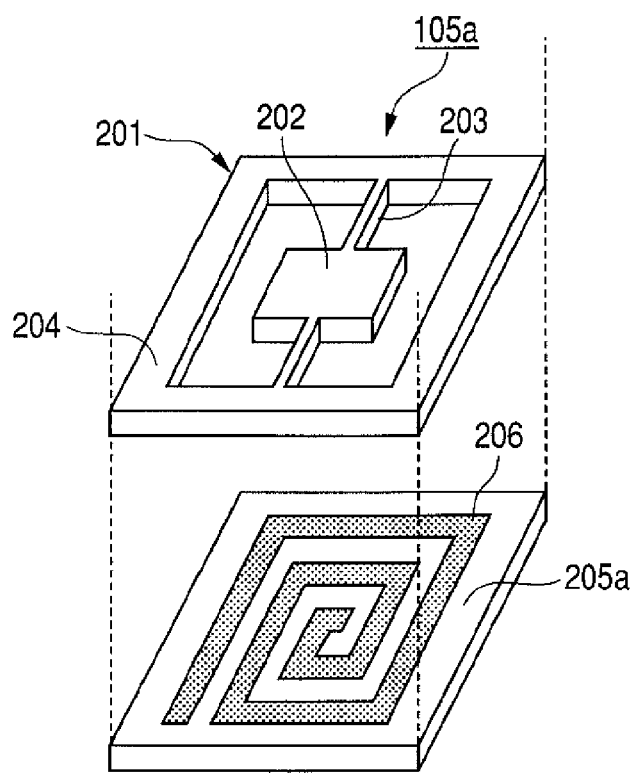
FIG. 2 is a diagram schematically showing a horizontal deflector in the first embodiment of the present invention.

FIG. 2 schematically shows a horizontal deflector 105a that constitutes a part of the deflecting means 105 in this embodiment. The horizontal deflecting means 105a is a MEMS (acronym of Micro Electro-Mechanical Systems) mirror 201 manufactured using a semiconductor process.

A reflection surface 202 of the MEMS mirror 201 is connected with and supported on a support substrate 204 via torsion bars 203. A coil 206 is disposed on a substrate 205. A driving force is generated by interaction of an electromagnetic force generated by current supply to the coil 206 and a permanent magnet provided on the backside of the reflection surface 202.

This driving force twists the torsion bars 203 to resonate the reflection surface 202, whereby the light beam is deflected by the reflection surface 202.

The horizontal deflector 105a can deflect the light beam at high speed. Thus, it performs fast scan in the horizontal direction (first direction) on the surface to be scanned 107, in this embodiment.

On the other hand, a vertical deflector 105b that constitutes a part of the deflecting means 105 shown in FIG. 1 has an optical mirror attached on the rotary shaft of a stepping motor.

Accordingly, the vertical deflector 105b can operate slowly in a relatively unrestricted manner. Thus, it performs slow scan in the vertical direction (second direction).

The horizontal deflector 105a is connected with a horizontal deflector drive portion 108 and a horizontal drive circuit 109. The vertical deflector 105b is connected with a vertical deflector drive portion 110 and a vertical drive circuit 111.

The light source means 101 is connected with a light source drive circuit 112. The light source drive circuit 112, the horizontal drive circuit 109 and the vertical drive circuit 111 are connected with a control circuit 113, so that timing of light emission and deflecting operations are controlled by the control circuit 113.

An image signal is input to the control circuit 113 from signal input means, which is not shown in the drawings. The control means 113 performs various drive control based on the input signal.

The horizontal deflector 105a swings back and forth in the direction indicated by arrow 114. The deflected light beam 106 deflected by the horizontal deflector 105a scans the surface to be scanned 107 to form forward scanning lines 115 and backward scanning lines 116. In this way, the horizontal scanning is a bi-directional scanning in which drawing is performed in both the forward and backward paths.

The vertical deflector 105b rotates in the direction indicated by arrow 117. The surface to be scanned 107 is scanned in the direction indicated by arrow 118 with the light beam deflected by the vertical deflector 105b.

Thus, forward and backward scanning lines 115, 116 are formed on the surface to be scanned 107 sequentially from the upper side to the lower side.

When the light beam reaches the lower end of the scanning area, the vertical deflector 105b rotates in the reverse direction at a high speed. As a result, the light beam returns to the upper end of the scanning area. This movement is called flyback. During the flyback period, the light source means 101 is kept off. In this way, the vertical scanning is performed in a saw-tooth wave manner in which forward rotation and reverse rotation are repeated alternately, wherein an image is drawn on the surface to be scanned 107 during the forward rotation.

The deflected light beam 106 also scans a portion of the surface to be scanned 107 outside the image drawing area 119. Optical detection means is provided in that portion to detect light so as to synchronize driving of the deflecting means 105 and the image signal associated with the light beam emitted from the light source means 101.

The resolution of the scanning image display apparatus according to this embodiment is SVGA. Accordingly, in the image drawing area 119 are arranged 800 pixels along the horizontal direction and 600 pixels along the vertical direction. This means that 300 forward scanning lines and 300 backward scanning lines are formed in a single two-dimensional scanning.

It should be noted that only a reduced number of scanning lines are illustrated in FIG. 1.

Figure 3A:
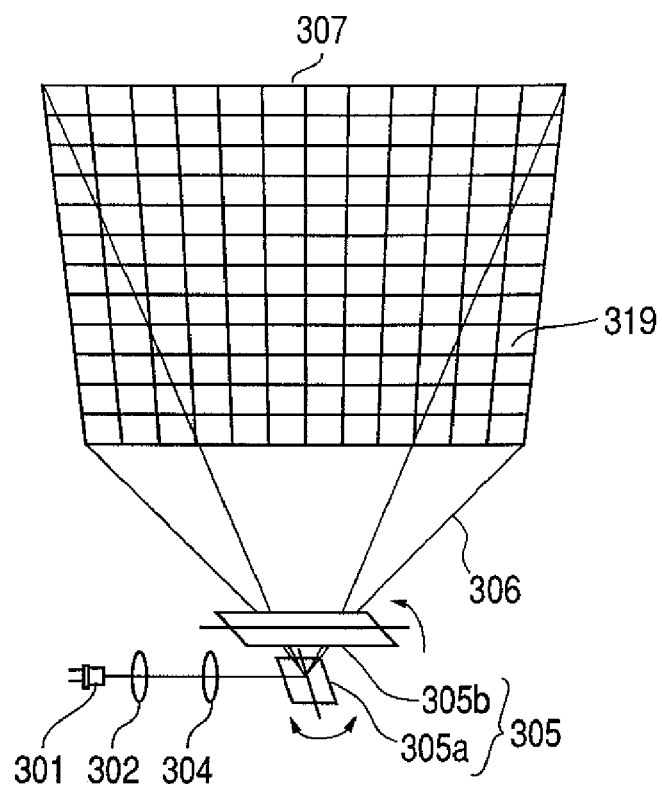
FIGS. 3A and 3B are diagrams schematically showing a two dimensional scanning image display apparatus according to a comparative example associated with the first embodiment of the present invention.

FIG. 3A schematically illustrates a scanning image display apparatus according to a comparative example associated with the present invention. In this apparatus, a light beam emitted from a semiconductor laser 301 is incident on deflecting means 305 via a collimator lens 302 and an imaging lens 304. The deflecting means 305 has a horizontal deflector 305a and a vertical deflector 305b to deflect the incident beam toward a screen 307. The screen 307 is two-dimensionally scanned with the deflected light beam 306. An image 319 drawn by the above described scanning is displayed as a trapezoidal image whose width increases toward the upper side. This is an image with a so-called keystone distortion.

Figure 3B:
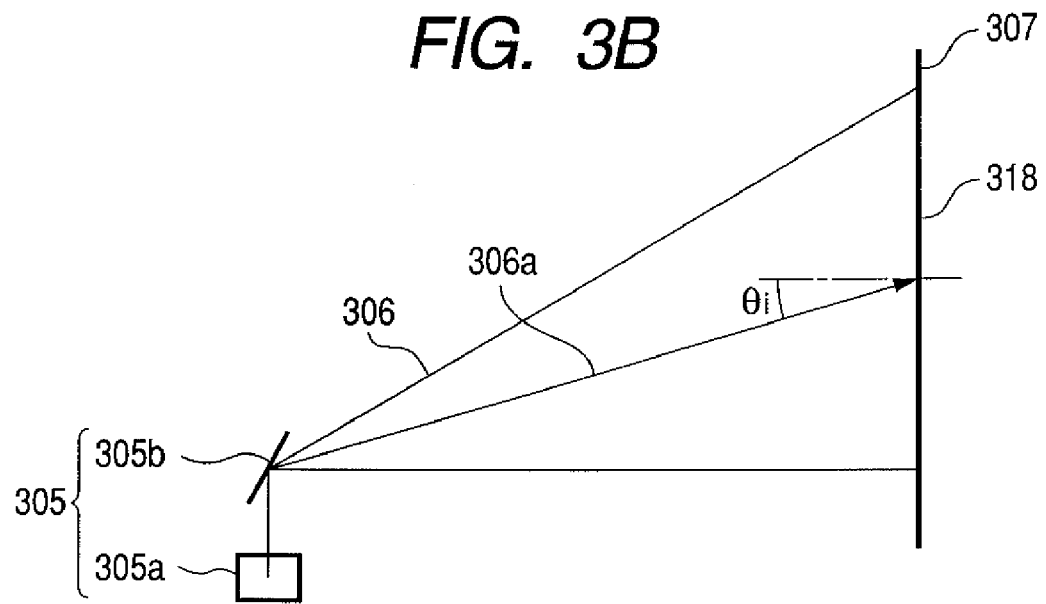

FIG. 3B is a vertical cross sectional view of the apparatus according to the comparative example shown in FIG. 3A. The deflected light beam 306 deflected by the deflecting means 305 for scanning is incident on the screen 307 obliquely. Here, the projection angle θi is defined as the angle of incidence on the screen 307 of a specific deflected light beam 306a (among the deflected light beam 306) that is incident at the center of the image drawing area 318. When the projection angle θi is not zero, the projection is called oblique projection.

In the case of oblique projection, a keystone distortion occurs in the scan image 319 on the screen 107, as shown in FIG. 3A. The width of the projected image increases gradually toward the upper side of the scan image 319 due to an increase in the optical path length from the deflection means 305 to the screen 307. In other words, the higher the position in the scan image 319 is, the longer the scanning line is.

In view of this, in this embodiment, the deflection angle range of the deflecting means 305 in the first direction is changed during a single two-dimensional scanning process so that the lengths of scanning lines become uniform, thereby correcting keystone distortion.

When a position at which the beam incidence angle with respect to the second direction is large is scanned, the deflection angle range in the first direction is designed to be smaller than when a position at which the beam incidence angle with respect to the second direction is small is scanned.

Specifically, the deflection angle range of the deflecting means 305 in the first direction is varied in such a way that the lengths of the scanning lines in the first direction of the deflected light on the surface to be scanned 307 become uniform at all positions in the second direction.

More specifically, the angle range or amplitude of oscillation or swing (i.e. deflection angle range) of the horizontal deflector 305a is gradually changed every time two-dimensional scanning on the screen 307 is performed by the deflecting means 305. Thus, variations in the optical path lengths from the deflecting means 305 to points on the screen 307 are cancelled, whereby the lengths of the scanning lines are made identical.

The deflection angle range in the first direction in projecting a light beam to a plane is varied depending on the maximum value of the projection angle. For example, when the maximum value of the projection angle is in the range of 50° to 60°, the maximum angle range βmax and the minimum angle range βmin are designed to satisfy the following condition: $1.2 < (\beta max / \beta min) < 2$.

The image drawing area is scanned in 90% of the entire deflection angle range of the horizontal deflector 305a, and the non-image drawing area is scanned in 10% thereof.

The reference deflection angle range of the horizontal deflector 305a is ±10.5 (degrees), and the image drawing area is scanned within the deflection angle range of ±9.45 (degrees).

Figure 4:
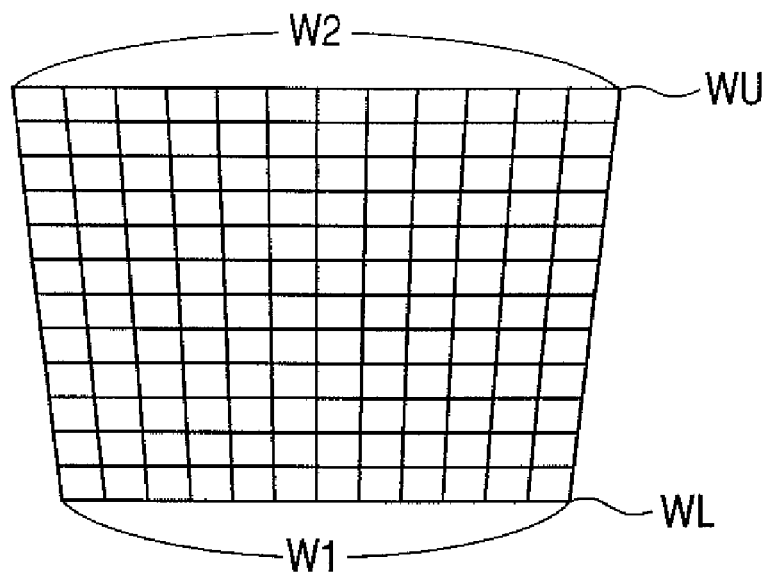
FIG. 4 shows a scan image in the comparative example associated with the first embodiment of the present invention.

FIG. 4 shows a scan image (image that is viewed as a residual image of the scanning lines) in the comparative example associated with the invention. The scan image in the comparative example includes keystone distortion, where the width increases greatly toward the upper side. The scanning line at the position WL at which the incidence angle of the deflected light beam is the smallest (i.e. the lower end of the scan image) has the shortest length. The width of the scan image at this position is represented by W1. The scanning line at the position WU at which the incidence angle of the deflected light beam is the largest (i.e. the upper end of the scan image) has the largest length. The width of the scan image at this position is represented by W2. To make the lengths of all the scanning lines identical, the least width W1 at the lower end of the scan image is taken as the reference.

In this embodiment, the deflection angle range of the deflecting means 305 in the first direction is changed in such a way that the scanning locus length of the deflected light beam in the first direction on the surface to be scanned 307 changes depending on the position in the second direction with reference to the scanning locus length at the position at which the scanning locus length becomes the shortest.

Figure 5:
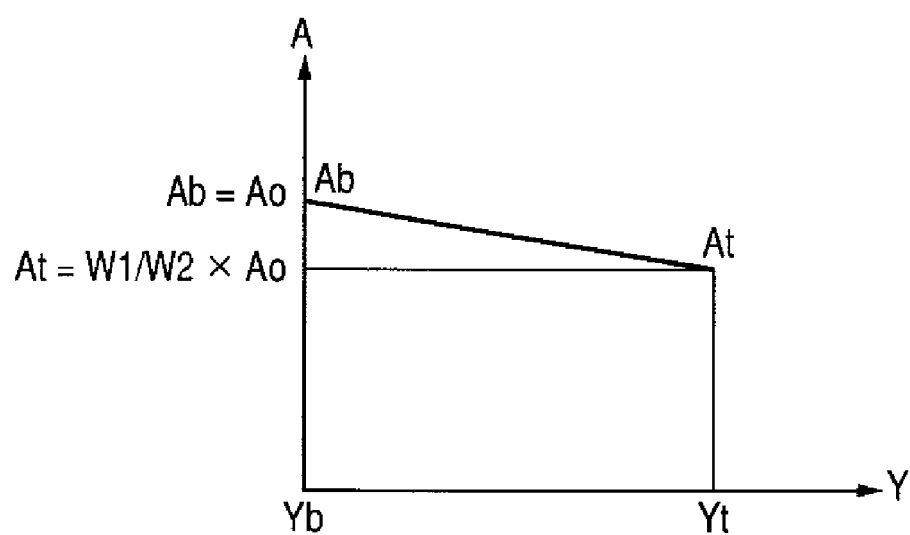
FIG. 5 is a graph showing angle range in horizontal scanning in relation to vertical position.

FIG. 5 shows the relationship of the vertical position Y in the scan image and the angle range A of the horizontal deflector. The top end of the vertical position in the scan image is represented by Yt, and the bottom end of the vertical position is represented by Yb. The deflection angle range of the horizontal deflector 305a at the top position Yt is represented by At, the angle range at the bottom position Yb is represented by Ab, and the reference angle range is represented by Ao.

Since the light beam incident on the surface to be scanned perpendicularly in the vertical section at the bottom end Yb, the deflection angle range at the bottom end Ab is designed to be equal to Ao (Ab=Ao). Based on the width W1 at the top end of the scan image and the width W2 at the bottom end, the deflection angle range at the upper end At is designed as At=W1/W2×Ao. Deflection angle ranges A of the horizontal deflector 305a at other vertical positions are determined by drawing the straight line between the above mentioned two points in the graph shown in FIG. 5.

The deflection angle range of the horizontal deflector 305a is controlled by changing the voltage applied to a coil of the horizontal deflector 305a.

Figure 6A:
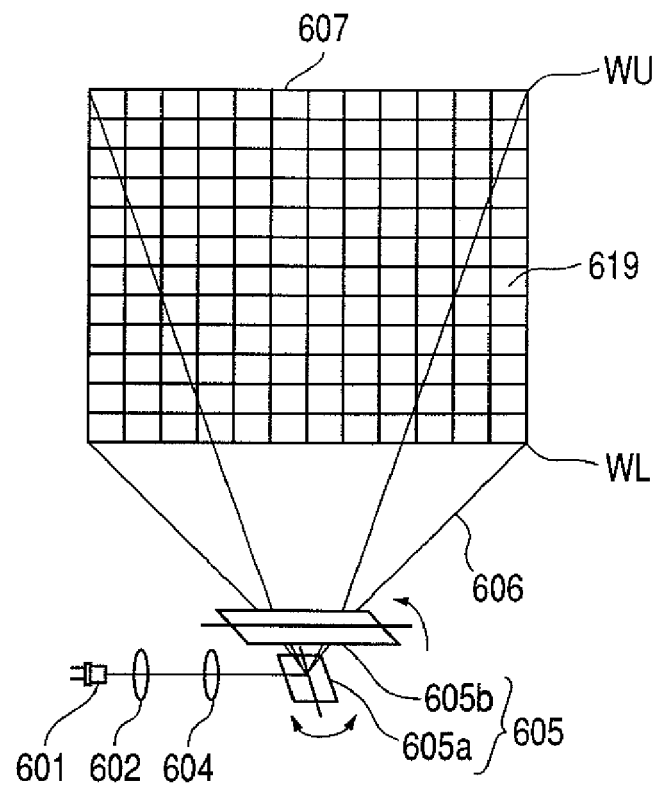
FIGS. 6A and 6B are diagrams schematically showing a two dimensional scanning image display apparatus according to the first embodiment of the present invention.
Figure 6B:
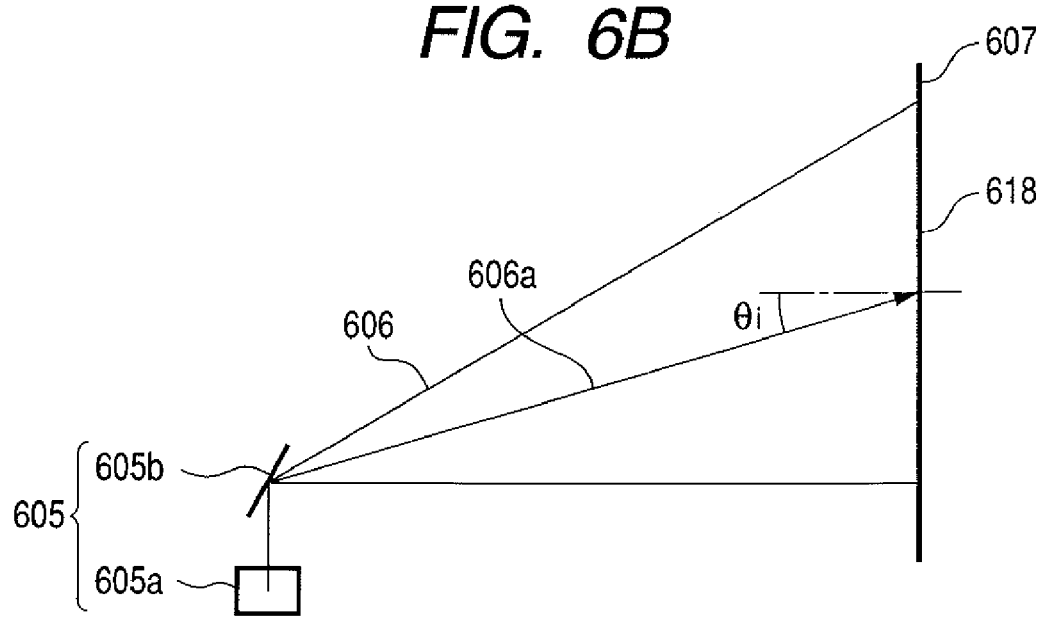

FIG. 6A is a diagram schematically showing the scanning image display apparatus according to this embodiment, and FIG. 6B is a vertical cross sectional view thereof. The apparatus according to the embodiment differs from the apparatus according to the comparative example shown in FIG. 3A in that the deflection angle range of the horizontal deflector 605a is controlled.

The deflecting means 605 is adapted to scan the surface to be scanned 607 with light from an oblique direction. The deflection angle range of the deflecting means 605 in the first direction is varied in such a way that the scanning locus length of the deflected light in the first direction on the surface to be scanned 607 is kept constant irrespective of the position with respect to the second direction. Thus, the scan image 619 formed on the surface to be scanned 607 is displayed in a rectangular shape. By gradually increasing the deflection angle range of the horizontal deflector 605a from the upper end WU of the scan image 619 to the lower end WL, the lengths of the scanning lines on the surface to be scanned 607 are made identical. Thus, keystone distortion of the projected image is corrected.

According to this embodiment, it is possible to project a high quality image on the screen 607 thanks to correction of keystone distortion that may otherwise occur in oblique projection.

In conventional technologies for correcting keystone distortion in which pixels are thinned out, the resolution of images is lowered and unpleasant unevenness in the resolution occurs. In contrast, in the correction method according to this embodiment, no original pixels are removed.

Although the light source means in the illustrated embodiment comprises a single semiconductor laser, three color lasers (including a red laser, a blue laser and a green laser) may be used to display a color image.

The deflection angle range or the amplitude of oscillation of the horizontal deflector 105a can be controlled by changing the distance between a permanent magnet disposed on the backside of the reflection surface 202 and a coil 206. When the distance between them is made larger, the force acting on the permanent magnet is reduced, and the amplitude of oscillation of the MEMS mirror 201 becomes smaller. Therefore, it is possible to control changes in the deflection angle range of the horizontal deflector by, for example, providing a piezoelectric element between the support substrate 204 and the substrate 205 to change their distance.

Second Embodiment

Figure 7:
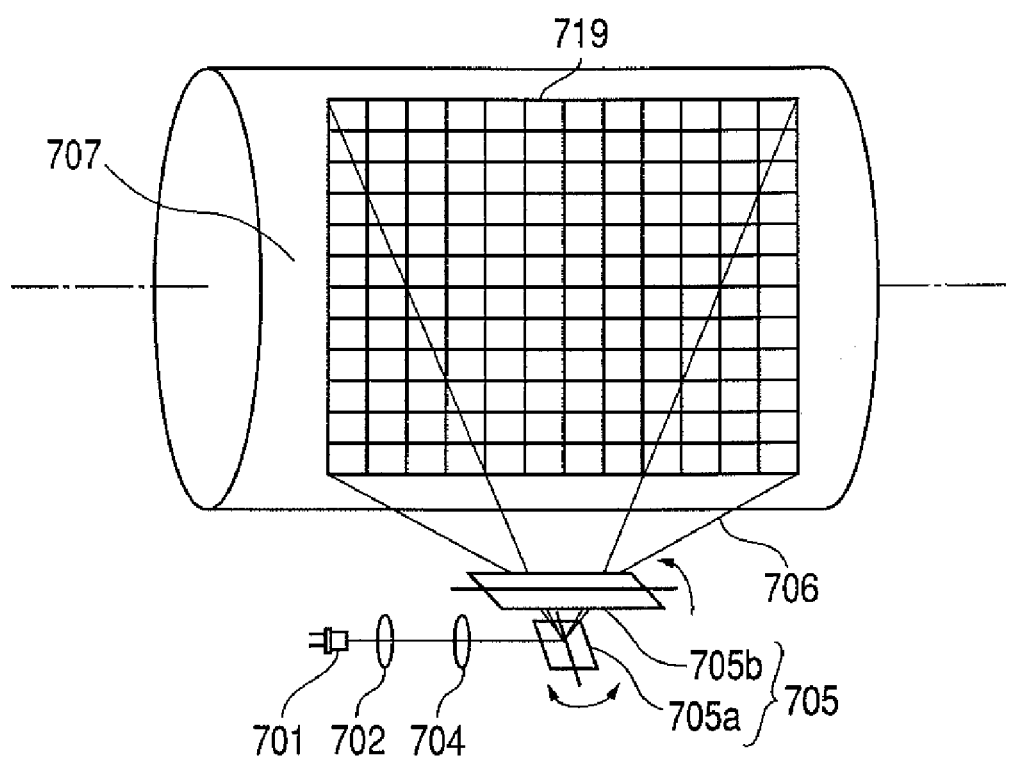
FIG. 7 is a diagram schematically showing a two-dimensional scanning image display apparatus according to a second embodiment of the present invention.

FIG. 7 is a diagram showing the relevant portion of a scanning image display apparatus using an optical scanning apparatus according to a second embodiment of the present invention. What is different in this embodiment from the first embodiment is that the shape of a screen serving as a surface to be scanned is not a plane but a cylindrical surface.

Two-dimensional scanning image display apparatuses generally have a large depth of field, and it can project a high definition image even on a three-dimensional cylindrical screen. However, a distortion sometimes occurs in the displayed image depending on the shape of the screen.

Figure 8A:
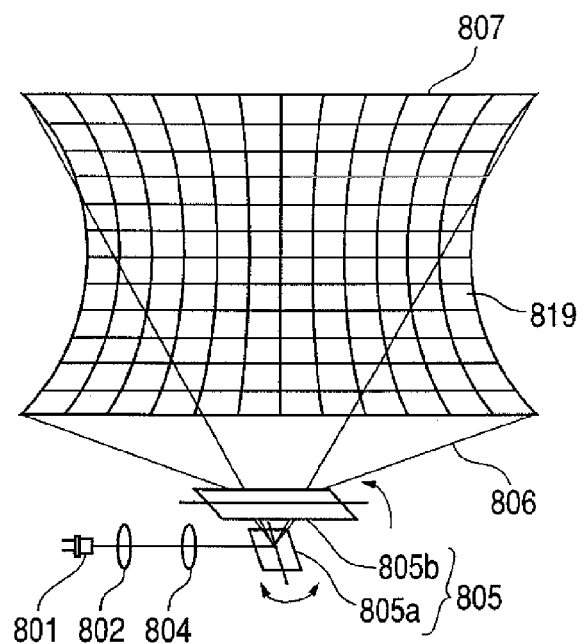
FIGS. 8A and 8B are diagrams schematically showing a two dimensional scanning image display apparatus according to a comparative example associated with the second embodiment of the present invention.
Figure 8B:
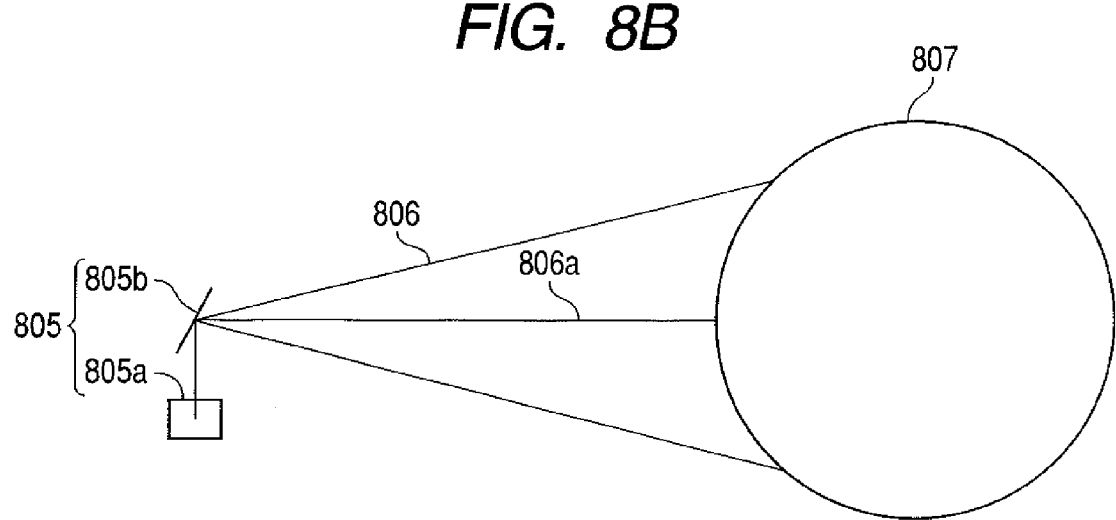

FIG. 8A is a diagram schematically showing a two-dimensional scanning image display apparatus according to a comparative example associated with the invention, and FIG. 8B is a vertical cross sectional view thereof.

A deflected light beam 806 emergent from deflecting means 805 is incident on a screen 807 having a cylindrical shape. The screen 807 is circular in its vertical cross section, and the position of (or distance to) the screen 807 changes depending on the vertical position.

Accordingly, the optical path length from the deflecting means 805 to the screen 807 varies, so that the projected image 819 is curved or distorted as shown in FIG. 8A.

In this embodiment, the deflection angle range of a horizontal deflector 805a is changed during a single two-dimensional scanning to correct the distortion of the scan image 819.

Specifically, the deflection angle range of the horizontal deflector is changed according to the vertical position in the scan image so that the lengths of the scanning lines become identical, in a manner similar to the first embodiment.

Figure 9:
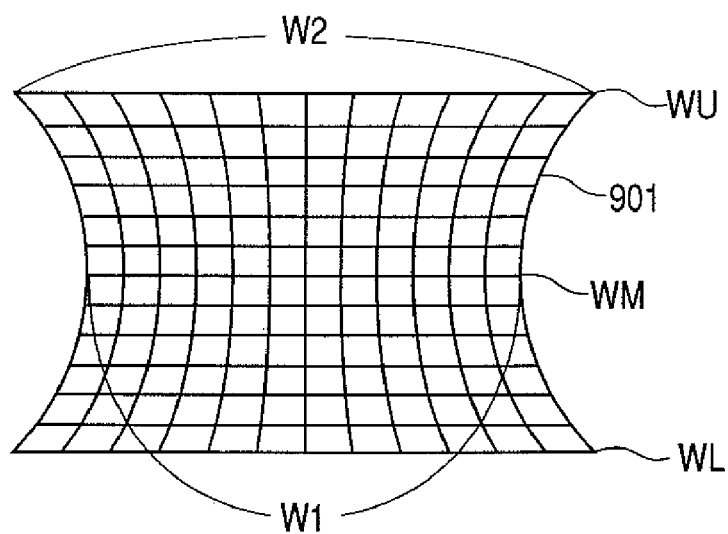
FIG. 9 shows a scan image in the comparative example associated with the second embodiment of the present invention.

FIG. 9 illustrates a scan image in the comparative example. The scan image 901 includes such a distortion that the horizontal width W1 at the middle WM with respect to the vertical direction is relatively small and the horizontal widths W2 at the upper end WU and the lower end WL are relatively large.

The width at the middle WM with respect to the vertical direction is represented by W1, and the width at the upper end WU is represented by W2.

Figure 10:
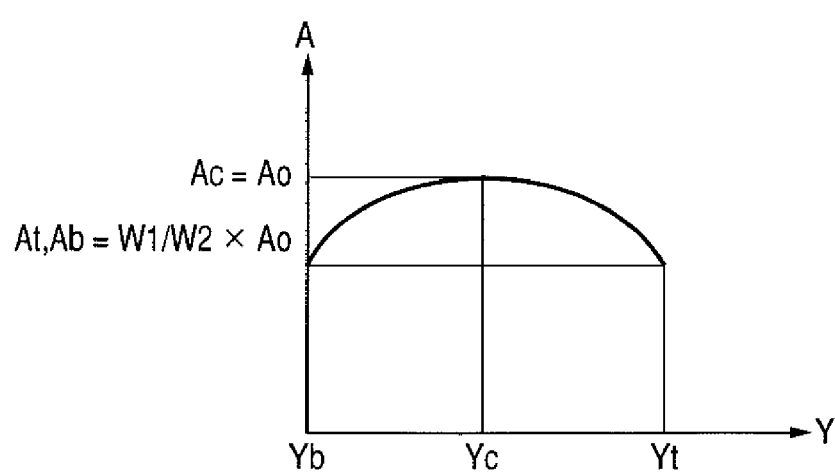
FIG. 10 is a graph showing angle range in horizontal scanning in relation to vertical position.

FIG. 10 is a graph illustrating the relationship between the vertical position Y in the scan image and the deflection angle range A of the horizontal deflector. The upper end with respect to the vertical direction of the scan image is represented by Yt, the lower end is represented by Yb and the center is represented by Yc. The deflection angle range A of the horizontal deflector at the upper end is represented by At, that at the lower end is represented by Ab, and that at the center of represented by Ac. The reference angle range is represented by Ao. The vertical center Yc is the position at which the light beam is incident perpendicularly on the screen 807 in the vertical section, and the deflection angle range Ac of the horizontal deflector 805a at this position is referred to as the reference Ao.

On the other hand, the deflection angle ranges At and Ab at the upper end Yt and the lower end Yb with respect to the vertical direction are made smaller by the ratio W1/W2 of the widths of the scan image. The deflection angle range of the horizontal deflector 805a at each position in between is determined in a similar manner according to the width of the scan image.

According to this embodiment, when a screen in the form of a cylindrical surface is used, it is possible to correct distortion in the scan image by changing the deflection angle range or the amplitude of oscillation of the horizontal deflector for scanning in the first scan direction according to the vertical position.

Third Embodiment

Figure 11A:
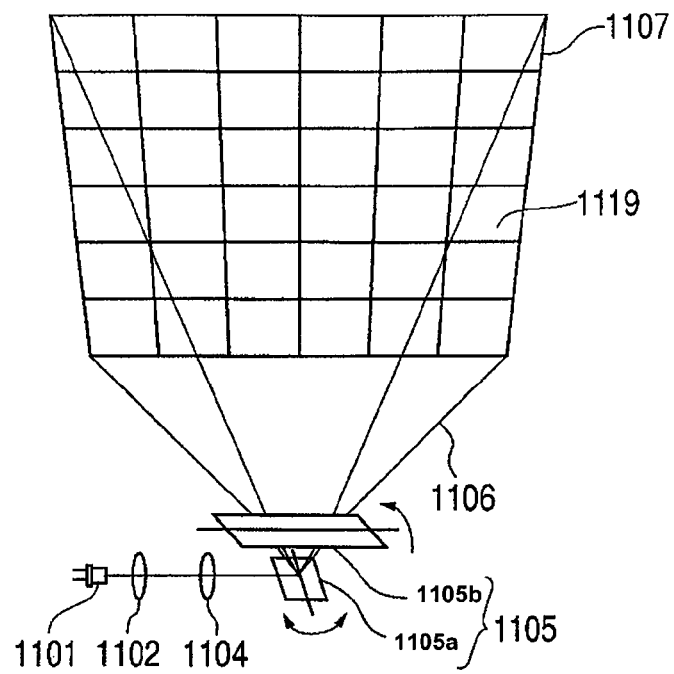
FIGS. 11A and 11B are diagrams schematically showing a two-dimensional scanning image display apparatus according to a third embodiment of the present invention.
Figure 11B:
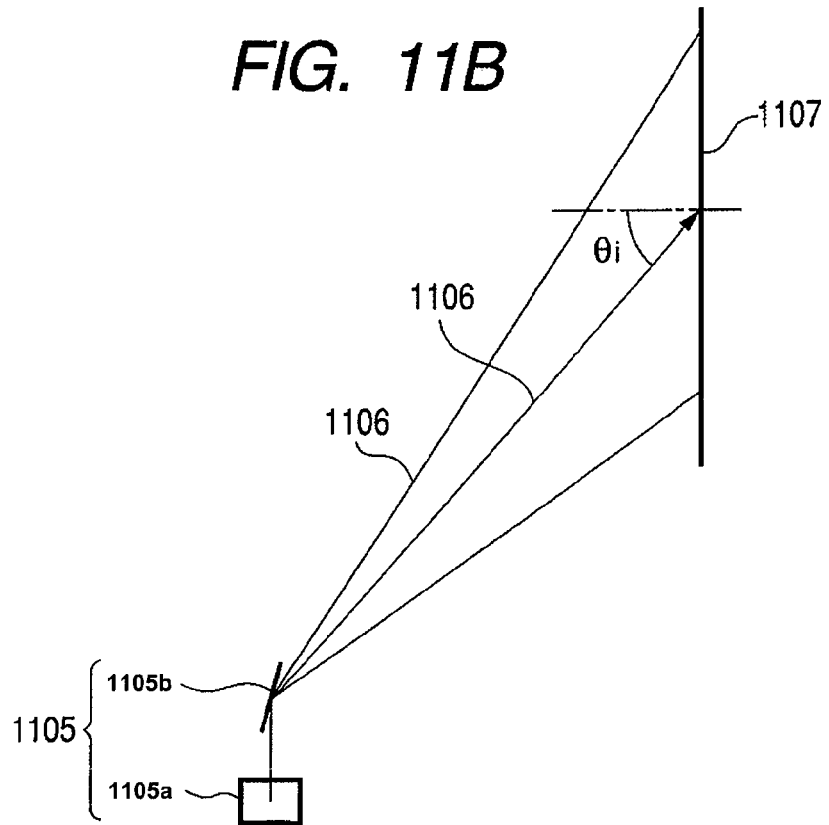

FIG. 11A is a diagram schematically showing the relevant portion of a scanning image display apparatus using an optical scanning apparatus according to a third embodiment of the present invention, and FIG. 11B is a vertical cross sectional view thereof.

The two-dimensional scanning image display apparatus according to this embodiment has a larger projection angle θi onto a screen 1107 than that in the first embodiment.

With an increase in the projection angle θi, it is possible to shorten the distance from deflecting means 1105 to the screen 1107, which leads to an increase in the degree of freedom in arranging the scanning image display apparatus. However, a large beam incidence angle leads to an increase in the non-linearity distortion as well as keystone distortion in the projected image.

In this embodiment, deflecting means is driven in such a way that intervals of scanning lines in optically scanning a surface to be scanned with a deflected light beam become uniform along the second direction.

Specifically, the deflecting means 1105 with horizontal deflector 1105a and vertical deflector 1105b is driven in such a way that the angular velocity in the second direction (vertical direction) becomes larger as the distance from the deflecting means 1105 to a scanning position on the surface to be scanned 1107 becomes shorter.

In other words, when scanning a position at which the incidence angle of the deflected light beam with respect to the second direction is relatively large, the deflecting means 1105 is driven with a smaller angular velocity than when scanning a position at which the incidence angle of the deflected light beam with respect to the second direction is relatively small.

Figure 12A:
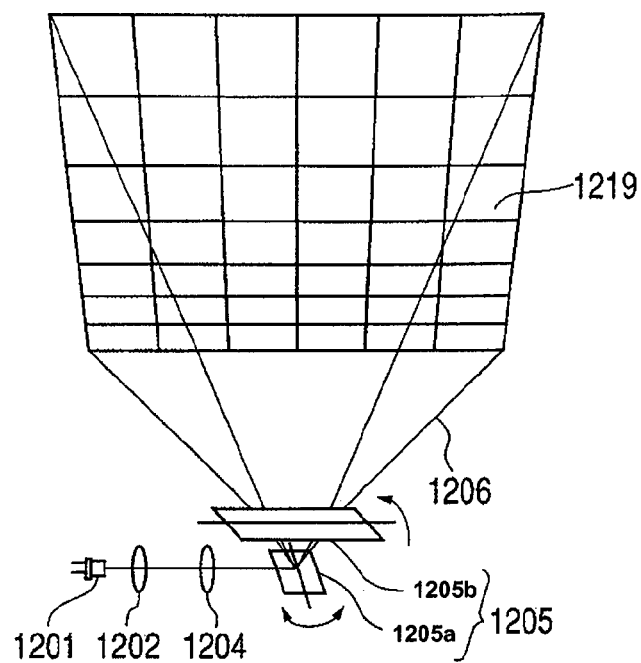
FIGS. 12A and 12B are diagrams schematically showing a two dimensional scanning image display apparatus according to a comparative example associated with the second embodiment of the present invention.
Figure 12B:
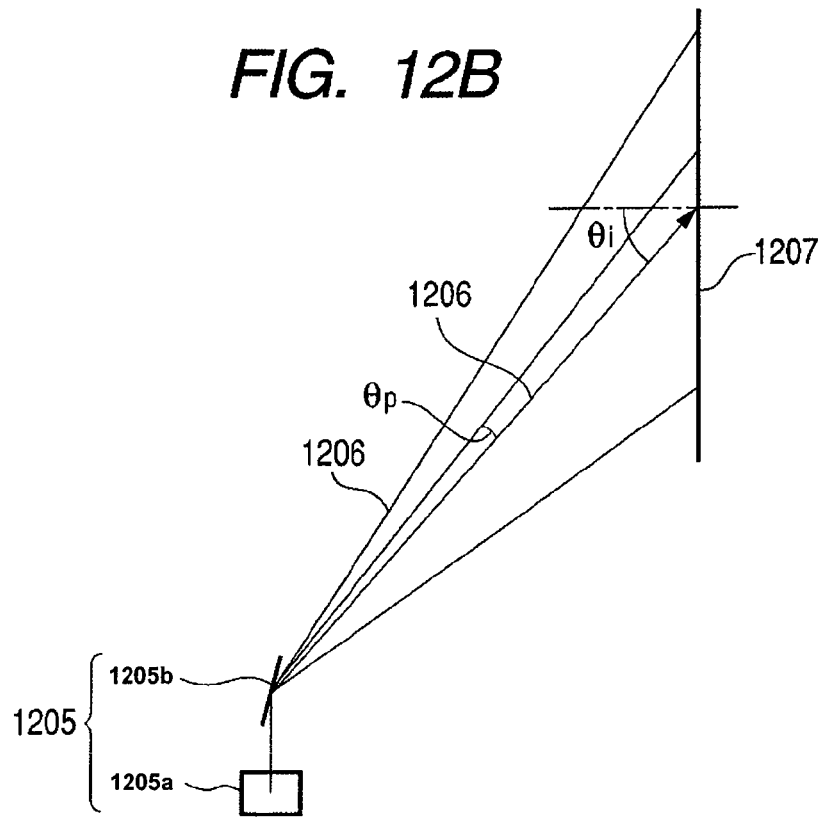

FIG. 12A is a diagram schematically showing a two-dimensional scanning image display apparatus according to a comparative example associated with the invention, and FIG. 12B is a vertical cross sectional view thereof.

A projected image shown in FIG. 12A includes a non-linearity distortion as well as a keystone distortion. Here, the non-linearity distortion refers to a distortion in which the ratio of the angle of field and the image height are not proportional to each other. In other words, it refers to a situation in which even if scanning is performed at regular intervals in terms of angle of field with respect to the vertical direction, the positions on the screen at which the deflected light beam reaches are not spaced at regular intervals.

Here, as shown in FIG. 12B, the projection angle in projecting a light beam from the deflecting means 1205 with horizontal deflector 1205a and vertical deflector 1205b to the screen 1207 is represented by θi, the pitch of the angle of field in the vertical direction is represented by θp, and the pitch number counted upwardly from the deflected light beam that reaches the center of the scan image is represented by n. Then, the ratio Ryp of the pitches in the scan image is expressed as follows.

$$Ryp = \frac{\tan\{\theta i + (n+2) \times \theta p\} - \tan\{\theta i + (n+1) \times \theta p\}}{\tan\{\theta i + (n+1) \times \theta p\} - \tan(\theta i + n \times \theta p)} \quad (1)$$

From the above equation (1) follows that the pitch ratio Ryp in the scan image increases with the increase in number n. Accordingly, in the projected image, the higher the position in the scan image is, the larger the interval becomes. In addition, the larger the projection angle θi is, the larger the image interval becomes.

This extension of image interval due to non-linearity distortion causes not only irregularity in pixel intervals but also unevenness in the illumination light quantity.

In view of this, in this embodiment, a vertical deflector 1205b is driven non-linearly so that intervals of scanning lines become uniform. Specifically, a pitch θp of the angle of field in the vertical direction that makes the pitch ratio Ryp in the scan image constant is obtained for each pitch number n in formula (1), and the vertical deflector 1205b is driven accordingly in a non-linear way.

For example, the deflecting means 1105 is driven in such a way that the angular velocity in the second direction increases or decreases monotonously.

In connection with this embodiment, intervals of scanning loci in optically scanning the surface to be scanned with the deflected light beam are said to be substantially uniform in the second direction when the following condition associated with the above mentioned formula (1) is satisfied.

$$0.9 < \frac{\tan\{\theta i + (n+2) \times \theta p\} - \tan\{\theta i + (n+1) \times \theta p\}}{\tan\{\theta i + (n+1) \times \theta p\} - \tan(\theta i + n \times \theta p)} \bigg/ Ryp < 1.1 \quad (1a)$$

More preferably, when the following condition is satisfied.

$$0.95 < \frac{\tan\{\theta i + (n+2) \times \theta p\} - \tan\{\theta i + (n+1) \times \theta p\}}{\tan\{\theta i + (n+1) \times \theta p\} - \tan(\theta i + n \times \theta p)} \bigg/ Ryp < 1.05 \quad (1b)$$

According to this embodiment, it is possible to make intervals of the scanning lines in the scan image formed on the surface to be scanned 1107 as shown in FIG. 11A uniform.

Although in this embodiment only non-linearity distortion in the vertical direction is corrected, the system like that described in connection with the first embodiment may also be used in combination.

More specifically, the method according to this embodiment may be used in combination with the method of correcting keystone distortion by changing the deflection angle range of the horizontal deflector during a single two-dimensional scanning to make the lengths of the displayed scanning lines identical.

In that case, both keystone distortion and non-linearity distortion of a projected image can be corrected excellently.

In addition, since the lengths of the scanning lines drawn by optical scanning in the first direction are made identical, keystone distortion that may occur in oblique projection and distortion that may occur when an image is projected on a three-dimensional screen can be corrected excellently.

Furthermore, since no pixels are removed, original high resolution is maintained, and a grid-like pixel arrangement pattern is achieved. Thus, natural and high quality images can be formed.

Still further, it is possible to cancel non-linearity distortion in a scan image by driving deflecting means in a non-linear manner, thereby making pixel intervals uniform. Still further, since it is not necessary to thin out or remove pixels or scanning lines, high definition images can be formed.

In the above described embodiments, measurement of the dimensions of the scanned area on a surface to be scanned in two-dimensional scanning with a deflected light beam may be performed to detect distortion based thereon, and the deflection angle range of the deflecting means in the first direction may be controlled based on the distortion thus detected.

The optical scanning apparatus according to the present invention can be used in various apparatuses such as a laser processing machine and a laser beam printer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-016218, filed Jan. 25, 2006, which is hereby incorporated by reference herein in its entirety.

What is claimed is:

1. An optical scanning apparatus comprising:
   a light source;
   deflecting means for deflecting a light beam emitted from the light source two-dimensionally in a first direction and a second direction, deflection speed of the deflecting means being higher in the first direction than in the second direction, and the apparatus scanning a surface to be scanned two-dimensionally with a deflected light beam deflected by the deflecting means in such a way that scanning loci in scanning in the first direction are arranged along the second direction,
   wherein the deflecting means is driven in such a way that its angular velocity in the second direction is smaller when optically scanning a position on the surface to be scanned at which the angle of incidence of the deflected light beam in the second direction is large than when optically scanning a position on said surface to be scanned at which the angle of incidence of the deflected light beam in said second direction is small, and wherein a light beam travelling to a center of a scanning range of the surface to be scanned is obliquely incident on the surface to be scanned.

2. An optical scanning apparatus according to claim 1, wherein said deflecting means is driven in such a way that its angular velocity in said second direction increases or decreased monotonously.

3. An optical scanning apparatus according to claim 1, wherein said deflecting means is driven in such a way that its angular velocity in said second direction is so changed that pitches of scanning loci in said second direction in scanning said surface to be scanned with the deflected light beam become identical.

4. A scanning image display apparatus comprising an optical scanning apparatus according to claim 1 and forming an image on the surface to be scanned.

5. An optical scanning apparatus according to claim 1, wherein a deflection angle range in the first direction of the deflecting means when scanning a position on the surface to be scanned at which the deflected light beam is incident thereon at a large angle in the second direction is smaller than that when scanning a position on the surface to be scanned at which the deflected light beam is incident thereon at a small angle in the second direction.

* * * * *